April 18, 1939. S. DE ORLOW 2,154,733
HINGE AND PROP STRUCTURE
Filed Aug. 30, 1937
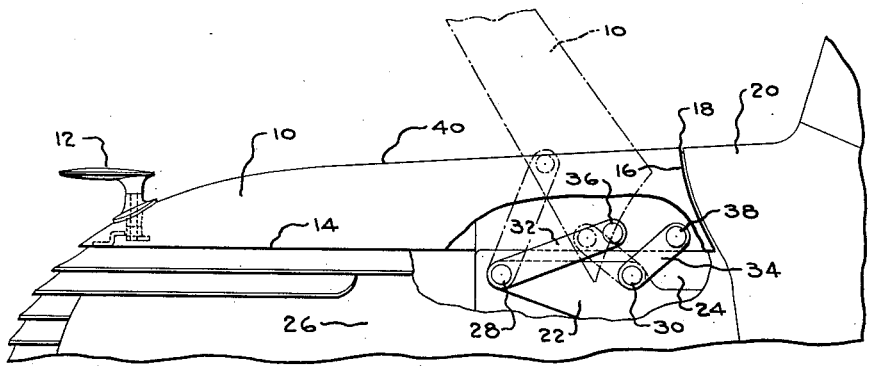
Fig. 1
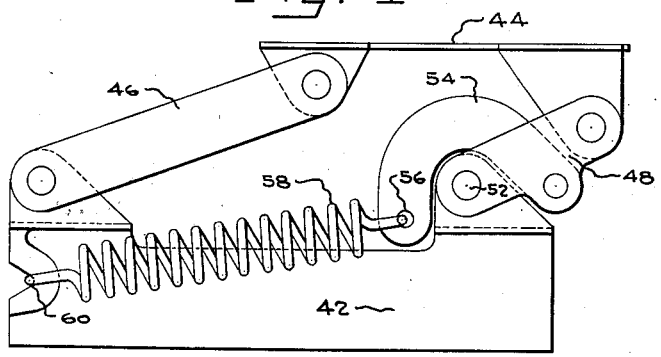
Fig. 2
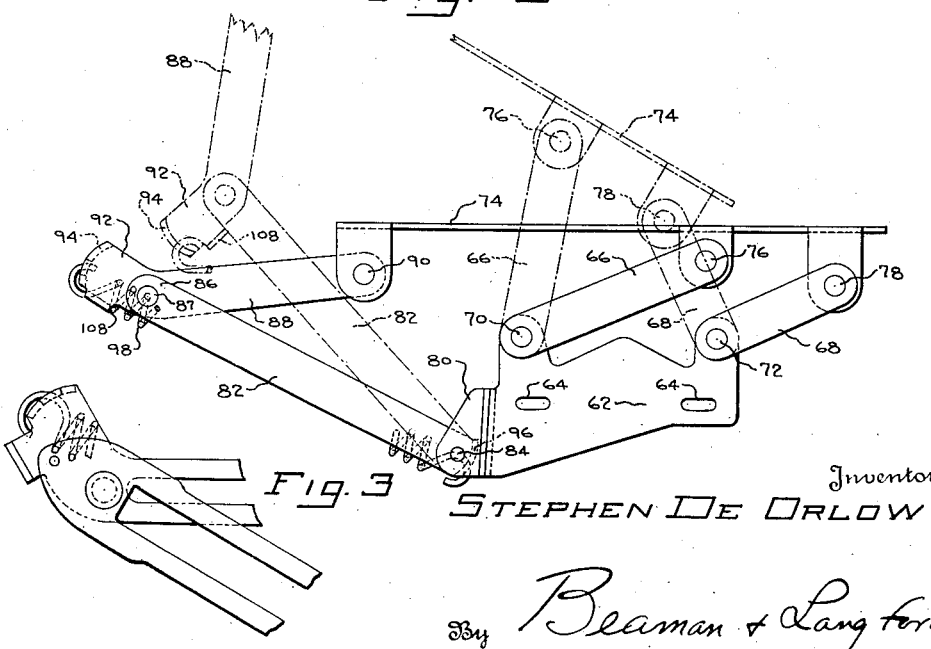
Fig. 3
Fig. 4
Inventor
STEPHEN DE ORLOW
By Beaman & Langford
Attorneys Patented Apr. 18, 1939

2,154,733

UNITED STATES PATENT OFFICE 2,154,733

HINGE AND PROP STRUCTURE

Stephen De Orlow, Detroit, Mich.

Application August 30, 1937, Serial No. 161,547

3 Claims. (Cl. 217—60)

The present invention relates to improvements in hinge and prop construction for hoods, rear decks, trunk lids of automobiles and the like and constitutes a continuation in part of my copending application Serial No. 118,861, filed January 2, 1937, now Patent No. 2,091,673 of Aug. 31, 1937.

Due to the usual curvilinearity of the exterior hinged parts of automobiles it is necessary that the hinge construction be characterized in its operation by the fact that the hinged part has forward or upward movement or both prior to or simultaneously with the pivotal action of the hinged part to clear the structure with which the hinged part is associated when in a closed position. In my copending application a hinge structure of this type has been fully disclosed and claimed and the present disclosure is concerned with means associated with such hinge structure and coacting therewith for holding the hinged part in raised position.

An object of the present invention is to provide resiliently acting prop means associated with a hinge structure of the aforesaid type and capable of resiliently supporting the hinge part when in open position.

Another object is to provide resiliently acting prop means for hinged parts capable of holding the latter in both opened and closed position.

A further object is to provide an improved spring actuated prop for hinged parts of the type described.

Other objects and advantages reside in the combination, arrangement and specific construction of the prop and spring construction for hinged parts of the type disclosed as will be more fully described hereinafter and as set forth in the annexed claims.

Fig. 1 is a side elevational view of a hood structure of an automobile showing the type of hinge structure to which the present invention relates, Fig. 2 is a side elevational view of a hinge structure of the general type shown in Fig. 1 embodying resiliently actuating means associated with the hinge structure for urging the hinge structure and associated hinged part to both open and closed positions, the hinge structure being shown disassociated from the fixed and hinged parts, Fig. 3 is a view similar to Fig. 2 of a modified form of the invention showing a separate prop being used in combination with a hinge structure of the type disclosed, and Fig. 4 is a fragmentary detailed view of a slightly different arrangement from that shown in Fig. 3 in which the spring acts to hold the hinged part in both open and closed position.

In Fig. 1 I have shown a side elevational view of an automobile having a lid type hood. The hinge structure for the hood is of that type disclosed in my aforesaid copending application. The lid 10 is equipped at the forward end with a handle 12 which may be rotated to lock and unlock the lid in the position shown in full line. The handle 12 is shown rotated through 180° preparatory to lifting the lid 10 to the dotted line position. The lower edge of the lid 10 is indicated at 14 and the rear edge at 16; the rear edge 16 with the lid 10 closed overlies a cushion ledge 18 of the cowl structure generally designated 20 in the manner of the conventional hood. Pivotally supported to a suitable base 22 bolted, welded or otherwise attached to the dash 24 of the cowl structure on opposite sides thereof upon pins 28 and 30 are arms 32 and 34 of different lengths which are pivotally connected to the inner side of the lid 10 by pins 36 and 38 anchored on the inner side of the lid 10. In most cases the pins 36 and 38 will be carried by a suitable reinforced member welded to the under side of the lid 10 upon opposite sides thereof adjacent the edge 14.

It will be noted from a consideration of Fig. 1 that the hinge line is materially below the crown 40. This necessitates bodily lifting of the entire lid 10 and forward movement thereof prior to or at the time of pivoted movement so that the edge 16 will clear the ledge 18 of the cowl. From the dotted line representation in Fig. 1 it will appear that the pins 36 upon opposite sides of the lid 10 constitutes the pivotal axis of the lid 10 and that this axis swings through an arc scribed by the arms 32. The shorter arms 34 define and control the pivotal movement of the lid 10 as it is raised and lowered. It is to be understood, however, that the pins 38 might be just as accurately considered the pivotal axis of the lid 10 and the longer arms 32 as in control of pivotal movement for the reason that pivotal movement of the lid 10 takes place about both the pins 36 and 38. In the construction shown in Fig. 1, for sake of clarity, no means are shown for supporting the lid 10 in the elevated position shown in dotted outline or for urging the lid 10 into the closed position shown in full line.

In Fig. 2 is shown a hinge structure similar to that shown in Fig. 1 but detached from the cowl and pivoted hood or lid. A base plate 42 is provided for suitable attachment to the cowl structure while an upper plate 44 is employed for attachment of the hinge structure to the under side of the hinged part. The long arm 46 and shorter arm 48 of the hinge structure corresponds to the arms 32 and 34 of the structure shown in Fig. 1 and function in the manner described with reference thereto. For resiliently urging the hinge structure to both opened and closed positions and any part associated with the upper plate 44, a C-shaped link is pivotally connected to the arm 48 and 50 and partially encircles the pivotal pin 52, about which the lower end of the arm 48 swings, terminating in a depending portion 54 in which an opening 56 is provided to receive a strongly tensioned coil spring 58 anchored at its opposite end 60 to a portion of the base plate 42. It will be observed from a consideration of Fig. 2 that with the hinge structure in the closed position shown, the line of tension of the spring is below the pivotal pin 52 thus the tension of the spring acts to rotate the arm 48 clockwise urging the hinge to its closed position. When the hinge structure is urged into an open position such as would result from raising the lid 10 of Fig. 1 the arm 48 is swung counter-clockwise and the line of tension of the spring will be above the pivotal pin 52 with the result that the tension of the spring will function to hold the hinge structure in an open position as well as any hinged part associated therewith by being connected to the plate 44. With this arrangement a part of a hinged structure, namely, the arm 48 has the additional function of serving as a prop and latching structure through which the hinged part is urged into either a closed or opened position through the tension of the spring 58.

A further form of the invention is shown in Fig. 3 in which the prop part of the hinge structure is separate and distinct from the swinging arms. The base 62 is provided with suitable openings 64 for securing the same to the sides of the cowl structure. The swinging arms 66 and 68 are pivotally supported to the base 62 at 70 and 72 at their lower ends and to the upper plate 74 at 76 and 78 at their upper ends. At the forward part of the base 62 is an ear 80 to which an arm 82 of the prop structure is pivotally connected by a bolt 84. Pivoted to the upper end 86 of the arm 82 by a rivet 87 is an arm 88 of the prop structure which is pivotally connected to the upper plate 74 through a bolt 90. The outer end of the arm 88 is extended beyond its pivotal connection of the arm 82 as at 92, the portion 92 of the arm 88 with the hinge structure closed being in substantial alignment with the arm 82. An apertured flange 94 is provided at one end of the arm 88 and a similar apertured flange 96 is provided at one end of the arm 82 for the purpose of connecting thereto the opposite hooked ends of the spring 98. A stop portion 100 is also provided on the arm 88 which limits the open position at which the prop supports the hinged part to be connected to the upper plate 74. It will be appreciated that the upper plate 74 may be omitted from the hinge structure and the arms 66, 68 and 88 fastened directly to the hinged part rather than indirectly through the upper plate 74. As will become apparent from consideration of the full line position of the hinge structure shown in Fig. 3, the line of action of the spring 98 is slightly below the center of the rivet 87. Through this arrangement even when the hinge structure is fully closed there is some tendency for the same to be moved toward open position under the tension of the spring. It is obvious, however, that if desired the line of action of the spring could be through the axis of the rivet 87 and thus there would be no tendency for the hinged structure to be urged toward open position when in a closed position. Moreover, if it were so desired the point of attachment of the spring with the flange 94 could be arranged to position the line of action of the spring slightly above the axis of the rivet 87 as shown in Fig. 4 so that there would actually be a tendency for the spring to hold the hinged structure in a closed position in a manner similar to the modified form shown in Fig. 2 until such times as the arm 88 had been sufficiently swung counter-clockwise to carry the line of action of the spring below the axis of the rivet 87.

It will be understood that the amount of support required to hold the hinged part in open position is at a maximum upon initial opening and decreases as the hinged part is swung into full open position which, in the case of the lid 10, would be the dotted line position shown in Fig. 1. The counterbalancing action of the spring 98 has a minimum effect during initial opening as the effective lever arm with reference to the axis of the rivet 87 is then relatively small. However, with the hinged part swung to its full open position, which would be the dotted line position of the part shown in Fig. 3, the effective lever arm is greatest and maximum counterbalancing and support is given to the hinged part at a time when a minimum amount of support is required to hold the hinged part in its full open position. By this construction a minimum sized spring may be employed to adequately support the hinged part in its full open position. This is of importance from the standpoint of cost of manufacture and all difficulties accompanying the assembly of heavy high tension springs are avoided. Both of the prop arrangements shown in Figs. 2 and 3 for resiliently supporting the hinged part in open position are adapted to the characteristic pivotal movement imparted to the hinged part by the herein disclosed hinge construction which is more fully treated in the aforesaid copending application.

In view of the fact that the hoods and rear decks of automobiles when raised in connection with inspection, servicing or use of the automobile necessitate persons placing various parts of their body within the arc of the hinged part, it is desirable that the hinged part, following initial opening movement have a tendency to move toward full open position and remain there sufficiently secure as not to be dislodged by sudden gusts of wind, vibration or shock. Through proper selection of the spring structure the prop shown in Figs. 2 and 3 are capable of accomplishing the desired result. Moreover, the hinge construction itself facilitates the resilient supporting action of the springs for the reason that due to the manner in which the hinged part is pivotally guided and supported, it is capable of assuming a more vertical position when fully opened than has been heretofore practical and yet have the hinged part so positioned, when fully opened, as to be readily manipulated for closing.

Having described my invention, what I claim and desire to secure by Letters Patent is:

1. A prop for a hinged part in the form of a hinged linkage having the lower end pivotally connected to a fixed part and the upper end pivotally connected to a hinged part, a pivotal connection between the points of attachment of said prop with said fixed and hinged parts, and a spring connected to said prop and acting to extend the same to support said hinged part in opened position, the line of action of said spring being disposed to one side of said last pivotal connection.

2. In combination, a fixed part, a hinged part, a prop for said hinged part, said prop comprising a pair of arms having pivotal connection with said fixed and hinged parts and with each other to provide an extensible and collapsible linkage, one of said arms extending beyond its pivotal connection with the other of said arms constituting a spring anchorage, and a tension spring having one end connected to said anchorage and its opposite end relatively fixed, the points of anchorage at the opposite ends of said spring being so located that the line of action thereof is disposed to one side of said last pivotal connection whereby said spring acts to extend said linkage to support said hinged part in open position.

3. In combination, a fixed part, a hinged part, a prop for said hinged part, said prop comprising an arm pivotally connected at one end to said hinged part, a second arm pivotally connected at one end to said fixed part and having pivotal connection at its other end with said first arm intermediate the ends thereof, that portion of said first arm projecting beyond its pivotal connection with said second arm constituting a spring anchorage, a tension spring connected at one end to said anchorage and having its other end relatively fixed, the points of anchorage of said hinge being so arranged whereby the line of action of said spring passes through the axis of the pivotal connection between said arms with said hinged part in a partially opened position so that the line of action of said spring is positioned on one side of the axis of said last pivotal connection to urge said hinged part toward open position and when on the opposite side of said axis to urge said hinged part into its fully closed position.

STEPHEN DE ORLOW.